(12) United States Patent
Napier

(10) Patent No.: US 10,591,068 B2
(45) Date of Patent: Mar. 17, 2020

(54) BALL AND SEAT VALVE FOR HIGH TEMPERATURE AND PRESSURE APPLICATIONS

(71) Applicant: Halliburton Energy Services, Inc., Houston, TX (US)

(72) Inventor: Rory Archibald Napier, Montrose (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/565,797

(22) PCT Filed: May 14, 2015

(86) PCT No.: PCT/US2015/030736
§ 371 (c)(1),
(2) Date: Oct. 11, 2017

(87) PCT Pub. No.: WO2016/182574
PCT Pub. Date: Nov. 17, 2016

(65) Prior Publication Data
US 2018/0119824 A1    May 3, 2018

(51) Int. Cl.
*F16K 5/06*    (2006.01)
*F16K 27/06*   (2006.01)
(Continued)

(52) U.S. Cl.
CPC ............ *F16K 5/0605* (2013.01); *E21B 34/06* (2013.01); *F16K 5/0689* (2013.01); *F16K 5/20* (2013.01);
(Continued)

(58) Field of Classification Search
CPC ........ F16K 5/0605; F16K 5/0689; F16K 5/20; F16K 5/201; F16K 5/202; F16K 5/204;
(Continued)

(56) References Cited

U.S. PATENT DOCUMENTS 3,227,174 A    1/1966 Yost
3,428,663 A *  2/1969 Whitehouse .............. C07F 3/10
                                                    556/128
(Continued)

FOREIGN PATENT DOCUMENTS

EP    0224642 A1    6/1987
EP    0326844 A2    8/1989
(Continued)

OTHER PUBLICATIONS

International Preliminary Report on Patentability issued in related PCT Application No. PCT/US2015/030736, dated Nov. 23, 2017, 14 pages.
(Continued)

*Primary Examiner* — Reinaldo Sanchez-Medina
*Assistant Examiner* — David Colon-Morales
(74) *Attorney, Agent, or Firm* — Benjamin Fite; Baker Botts L.L.P.

(57) ABSTRACT

A ball and seat valve for high temperature and pressure applications, such as those used in isolation barrier valves in subterranean wells, is disclosed. The valve incorporates thermally fitted sleeve into the ball and/or the seat to allow for greater pressures and temperatures due to resultant stresses left with the parts due to interference. Additionally, the materials making up the sleeves may be chosen to allow for greater resistance to corrosive and erosive wellbore fluids.

10 Claims, 3 Drawing Sheets

(51) Int. Cl.
*F16K 5/20* (2006.01)
*E21B 34/06* (2006.01)
*E21B 34/00* (2006.01)

(52) U.S. Cl.
CPC ...... *F16K 27/067* (2013.01); *E21B 2034/002* (2013.01)

(58) Field of Classification Search
CPC ... F16K 27/067; E21B 2034/002; E21B 34/06
See application file for complete search history.

(56) References Cited

U.S. PATENT DOCUMENTS

| | | | |
|---|---|---|---|
| 3,450,151 A | 6/1969 | Heutzenroeder | |
| 3,460,803 A | 8/1969 | Scaramucci | |
| 3,463,449 A * | 8/1969 | Eilers | F16K 5/08 251/309 |
| 3,463,450 A * | 8/1969 | Works | F16K 5/0642 251/309 |
| 3,488,033 A * | 1/1970 | Priese | F16K 5/202 251/172 |
| 3,501,128 A * | 3/1970 | Pool | F16K 5/0689 251/175 |
| 3,503,415 A | 3/1970 | Deangelis et al. | |
| 3,792,835 A * | 2/1974 | Shafer | F16K 5/0647 251/309 |
| 4,235,418 A * | 11/1980 | Natalizia | F16K 5/0626 251/174 |
| 4,273,309 A * | 6/1981 | Morrison | F16K 5/0673 251/174 |
| 4,460,157 A * | 7/1984 | Marchal | F16K 27/067 251/315.13 |
| 4,577,830 A | 3/1986 | Winegart | |
| 4,696,323 A | 9/1987 | Iff | |
| 4,738,431 A * | 4/1988 | Perkins | E21B 34/10 166/321 |
| 4,932,432 A * | 6/1990 | Berchem | F16K 5/0657 137/375 |
| 5,154,396 A | 10/1992 | Conley et al. | |
| 5,746,417 A * | 5/1998 | Bowers | F16K 5/0636 251/188 |
| 5,806,563 A * | 9/1998 | Rabby | E21B 34/06 137/613 |
| 6,651,958 B1 * | 11/2003 | James | F16K 5/0668 251/314 |
| 6,698,712 B2 | 3/2004 | Milberger et al. | |
| 6,899,132 B2 | 5/2005 | Mikiya et al. | |
| 7,004,638 B2 | 2/2006 | Nicholson | |
| 7,287,544 B2 * | 10/2007 | Seneviratne | E21B 21/106 137/375 |
| 7,758,016 B2 * | 7/2010 | Scott | F16K 5/205 251/192 |
| 8,505,639 B2 | 8/2013 | Robison et al. | |
| 8,663,170 B2 | 3/2014 | Wenchell et al. | |
| 8,727,315 B2 * | 5/2014 | Ringgenberg | E21B 34/06 166/332.3 |
| 8,783,279 B2 | 7/2014 | Williams et al. | |
| 8,864,105 B2 * | 10/2014 | Xu | F16K 5/204 251/314 |
| 9,212,536 B2 * | 12/2015 | Biddick | E21B 34/06 |
| 2003/0205688 A1 | 11/2003 | Milberger et al. | |
| 2008/0283787 A1 | 11/2008 | Zambonin et al. | |
| 2009/0032762 A1 | 2/2009 | Junier | |
| 2009/0056952 A1 | 3/2009 | Churchill | |
| 2012/0273223 A1 * | 11/2012 | Kalb | E21B 34/06 166/373 |
| 2013/0082202 A1 | 4/2013 | Morrison | |
| 2013/0291962 A1 | 11/2013 | Telfer | |
| 2014/0174728 A1 | 6/2014 | Speer et al. | |
| 2015/0008351 A1 | 1/2015 | Hartman et al. | |

FOREIGN PATENT DOCUMENTS

| | | |
|---|---|---|
| JP | S61127977 A | 6/1986 |
| WO | 2008-146012 A2 | 12/2008 |
| WO | 2011033544 A1 | 3/2011 |
| WO | 2013-119255 A1 | 8/2013 |
| WO | WO 2015105555 A1 * | 7/2015 ........... F16K 5/0642 |

OTHER PUBLICATIONS

International Search Report and Written Opinion issued in related PCT Application No. PCT/US2015/030736 dated Jan. 26, 2016, 17 pages.
Examiner's Letter issued in Canadian patent application No. 2,979,540 dated Oct. 12, 2018, 4 pages.
Search report issued in Netherlands patent application No. NL1041768 dated Jan. 16, 2017, 7 pages.
Written Opinion issued in Singapore patent application No. 11201708087Y dated Oct. 30, 2018, 7 pages.

* cited by examiner

BALL AND SEAT VALVE FOR HIGH TEMPERATURE AND PRESSURE APPLICATIONS

CROSS-REFERENCE TO RELATED APPLICATION

The present application is a U.S. National Stage Application of International Application No. PCT/US2015/030736 filed May 14, 2015, which is incorporated herein by reference in its entirety for all purposes.

TECHNICAL FIELD

This disclosure relates generally to equipment utilized and operations performed in conjunction with a subterranean well and in one example described below more particularly, provides a ball and seat valve capable of withstanding high temperature and high pressure applications.

BACKGROUND

Hydrocarbons, such as oil and gas, are commonly obtained from subterranean formations that may be located onshore or offshore. The development of subterranean operations and the processes involved in removing hydrocarbons from a subterranean formation typically include a number of different steps such as, for example, drilling a wellbore at a desired well site, treating the wellbore to optimize production of hydrocarbons, and performing the necessary steps to produce and process the hydrocarbons from the subterranean formation.

As oil and gas wells increase in depth to find sustainable reserves, the resultant reservoir pressures and temperatures have increased significantly. For example, at depths of 30,000 feet, it is not uncommon to experience temperatures over 350° F. and pressures over 10,000 psi. These increased downhole conditions have placed increased demands on downhole equipment, including, Isolation Barrier Valves. Current Isolation Barrier Valves utilize a simple spherical ball and seat arrangement as the closure device. In order to meet the current performance demands, the choice of materials to manufacture the ball and seat is becoming restricted and may be nearing the limits of currently approved materials.

The present disclosure is directed to an improved ball and seat valve which incorporates thermally fitted sleeves into the ball and/or the seat to allow greater pressures and temperatures due to the resultant stresses left within the parts due to interference.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
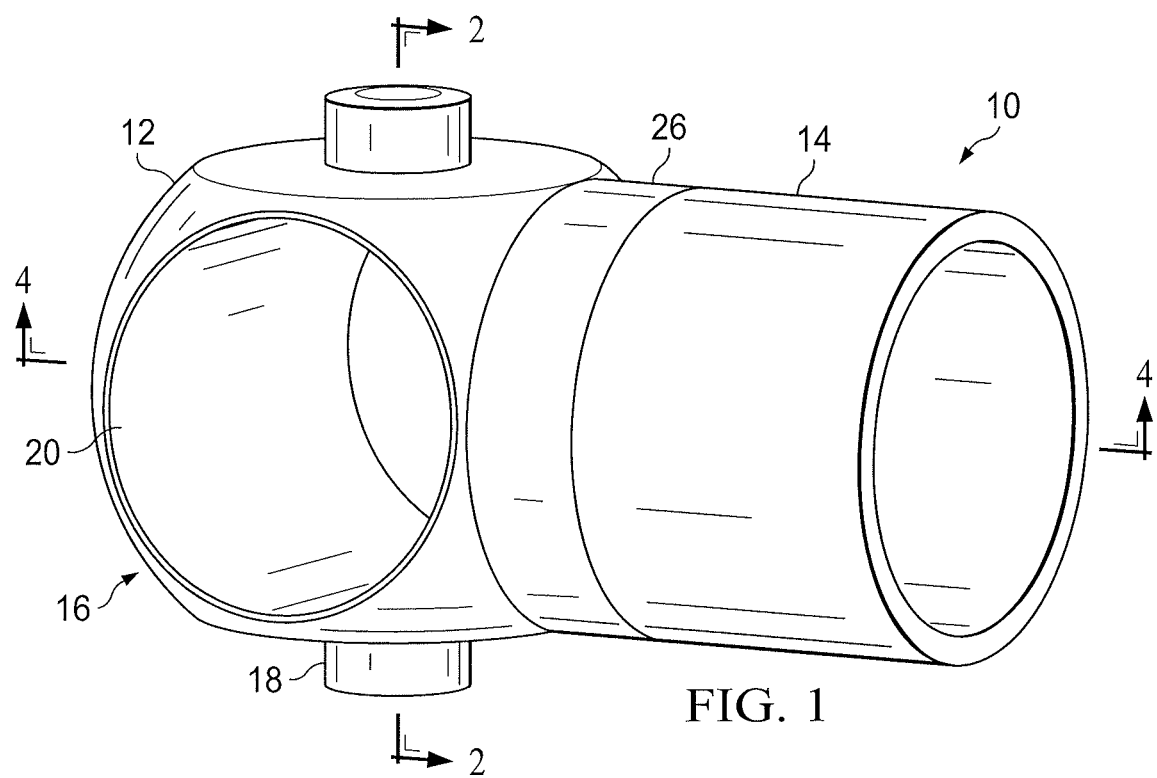
FIG. 1 is a schematic diagram illustrating one embodiment of an isolation barrier valve in accordance with the present disclosure.

An isolation barrier valve 10 in accordance with the present disclosure is illustrated in FIG. 1. The valve 10 includes a ball 12 and a seat 14. The ball 12 is generally spherically-shaped and formed of a metal alloy. In one embodiment, the ball 12 is formed of a metal alloy, such as a 41XX Series chromium-molybdenum alloy or more noble nickel alloy. As those of ordinary skill in the art will appreciate, other materials may be used in forming the ball 12, which are capable of withstanding the high temperature and high pressure environments found in deep water subsea and other deep and ultra-deep wells. The ball 12 is formed with a flow passage 16 formed therethrough. The flow passage 16 is generally cylindrically shaped and occupies a significant volume of the ball 12. The flow passage 16 is designed to withstand high pressure, high velocity flow of downhole fluids.

The ball 12 is formed with an axis 18 about which the ball is capable of rotating. As will be described further below, the ball 12 is capable of rotating through at least 90 degrees so as to assume one of two positions, one which can be characterized as an "open" position and the other which can be characterized as a "closed" position. In the "open" position, fluids are permitted to flow through the flow passage 16, for example, during the production of hydrocarbons from a subterranean formation of an oil and gas reservoir to the surface. In the "closed" position, fluid flow is shut off, thereby ceasing the flow of hydrocarbons to the surface. The isolation barrier valve can also be used to open and close the flow of completion and/or enhancement fluids downhole.

The seat 14 is a generally cylindrically-shaped tubular member. Like the ball 12, the seat 14, is formed of a metal alloy, for example, a 41XX Series chromium-molybdenum alloy or more noble nickel alloy. Again, as those of ordinary skill in the art will appreciate, other materials capable of withstanding the high temperature, high pressure environment of deep and ultra-deep wells can be used. The seat 14 in one example may have an inner diameter of approximately 4.5 inches and an outer diameter of approximately 5.0 inches, although, as those of ordinary skill in the art will appreciate, any suitably sized seat may be employed.

In one embodiment in accordance with the present disclosure, a support sleeve 20 is formed in and lines the surface of the flow passage 16 of the ball 12. In one embodiment, the support sleeve 20 is formed of the same metal alloy used to form the ball 12 and seat 14. The support sleeve is generally cylindrically-shaped and in one embodiment may vary in thickness from 0.0625 to 0.125 inches, although other suitable thicknesses and materials may be used. The support sleeve 20 may be thermally fit to the inner cylindrical surface of the ball 12 forming the flow passage 16. In one embodiment, the support sleeve 20 is cooled before being placed into the flow passage 16. Once it warms again, it forms an interference fit with the inner cylindrical surface of the ball 12. Alternatively, the ball 12 is heated hereby causing it to expand. The support sleeve 20 is then inserted into the ball 12, which is then allowed to cool. Once cooled, the support sleeve 20 is interference fit within the flow passage 16 of the ball 12. In the embodiment illustrated in FIG. 1, the support sleeve 20 is formed as a single sleeve which extends along the entire length of the cylindrical surface forming the flow passage 16.

Figure 3:
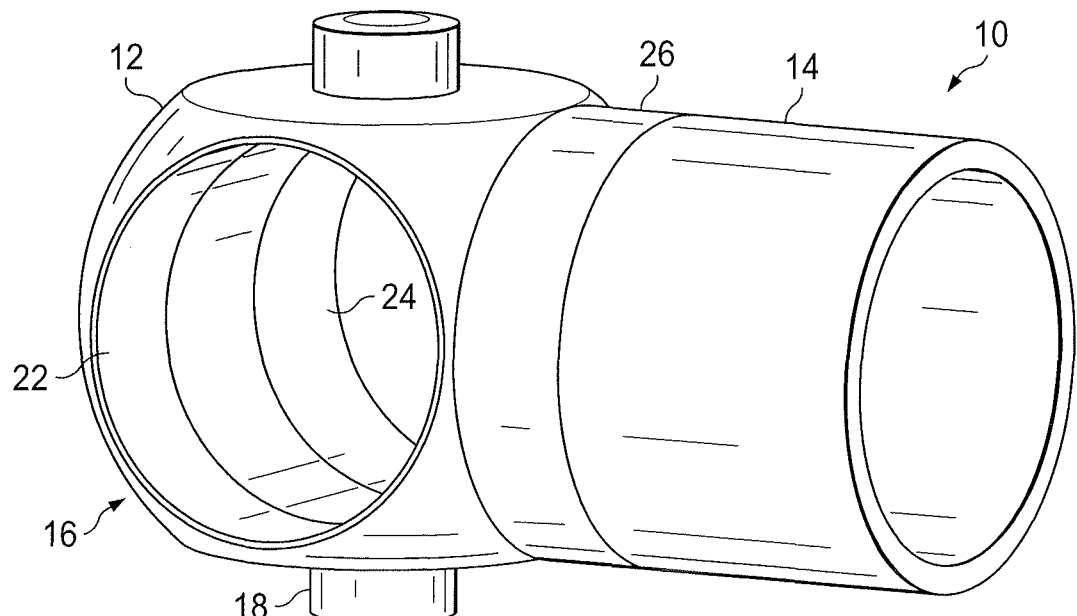
FIG. 3 is a schematic diagram illustrating another embodiment of an isolation barrier valve in accordance with the present disclosure.

In another embodiment in accordance with the present disclosure, a pair of generally cylindrically-shaped support sleeves 22 and 24 are used in place of the single support sleeve 20, as shown in FIG. 3. In this embodiment, the pair of support sleeves 22 and 24 may be made of the same material and installed in the manner described with reference to the single support sleeve 20. The pair of support sleeves 22 and 24 is installed each at opposite ends of the longitudinal length of the flow passage 16. Alternatively, a plurality of support sleeves are installed along the longitudinal length of the flow passage 16.

In accordance with the present disclosure, the seat 14 also may be provided with a support sleeve 26, as shown in FIGS. 1 and 3. The support sleeve 26 may also be formed of the same metal allow, for example, a 41XX Series chromium-molybdenum alloy or more noble nickel alloy, as the ball 12 and seat 14. Again, as those of ordinary skill in the art will appreciate other suitable materials may be used. The support sleeve 26 in one embodiment is approximately 0.0625 to 0.125 inches thick, but other suitable thicknesses may be employed. The support sleeve 26 is thermally fit to the seat 14. In one embodiment, the sleeve is heated and placed over a cool seat 14 and allowed to cool, thereby shrinking into an interference fit on the seat 14. In another embodiment, the support sleeve 26 is placed over the seat 14, which has been cooled and then allowed to warm so as to thereby form an interference fit between the support sleeve 26 and the seat 14.

Figure 2:
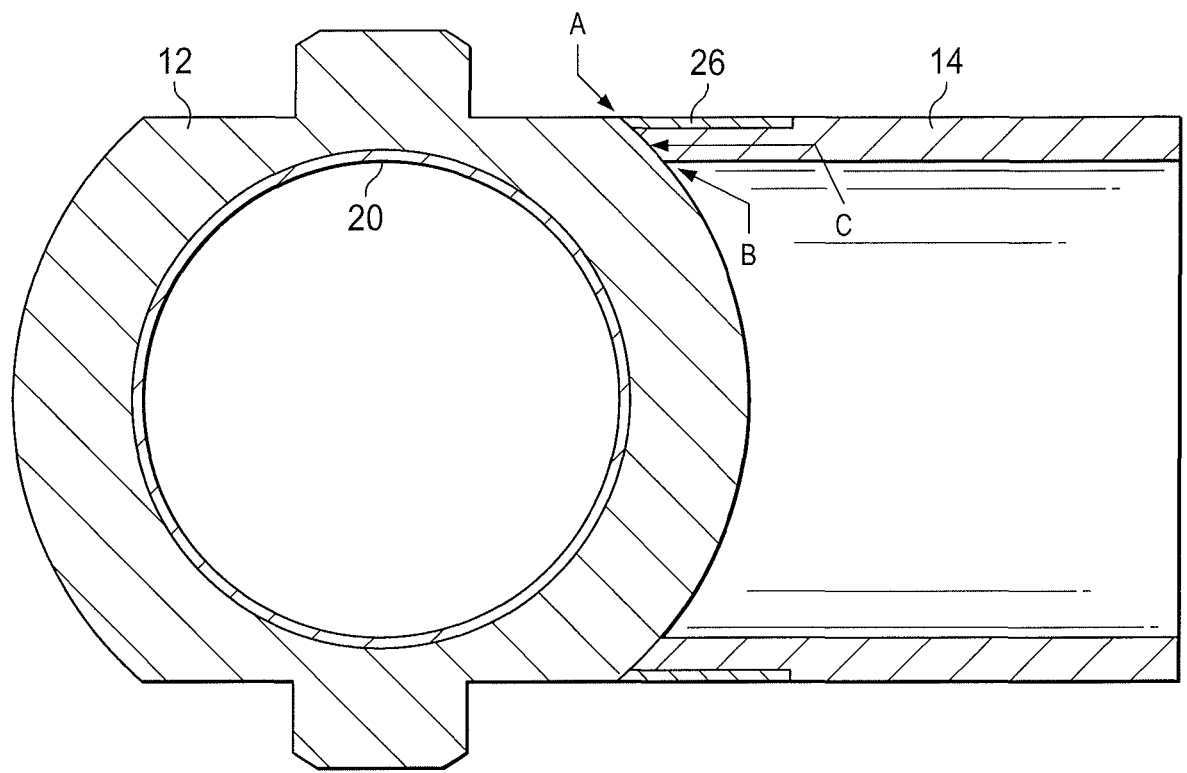
FIG. 2 is a cross sectional view of the isolation barrier valve shown in FIG. 1 taken along line 2-2.

As those of ordinary skill will appreciate at high temperatures and/or pressures which are experienced in deep well applications, the ball 12 and seat 14 have a tendency to deform due to the stresses created by the high temperature, high pressure fluid flow. This is illustrated in FIG. 2, by arrows A and B, which represent upstream and downstream pressure, respectively. These pressures cause the ball and seat to deform which can cause leakage of fluids out of the valve. The support sleeves 20 (or 22 and 24) and 26 in accordance with the present disclosure act to pre-stress the ball 12 and seat 14, respectively, and thereby prevent these components from deforming at higher temperatures and/or pressures than would be possible without the support sleeves. This is best illustrated in FIG. 2 where the support sleeve 26 is shown pre-stressing the seat 14 such that deformation at the point of contact between the ball 12 and seat 14 is prevented or at least minimized thereby preserving the integrity of the seal at point C.

Figure 4:
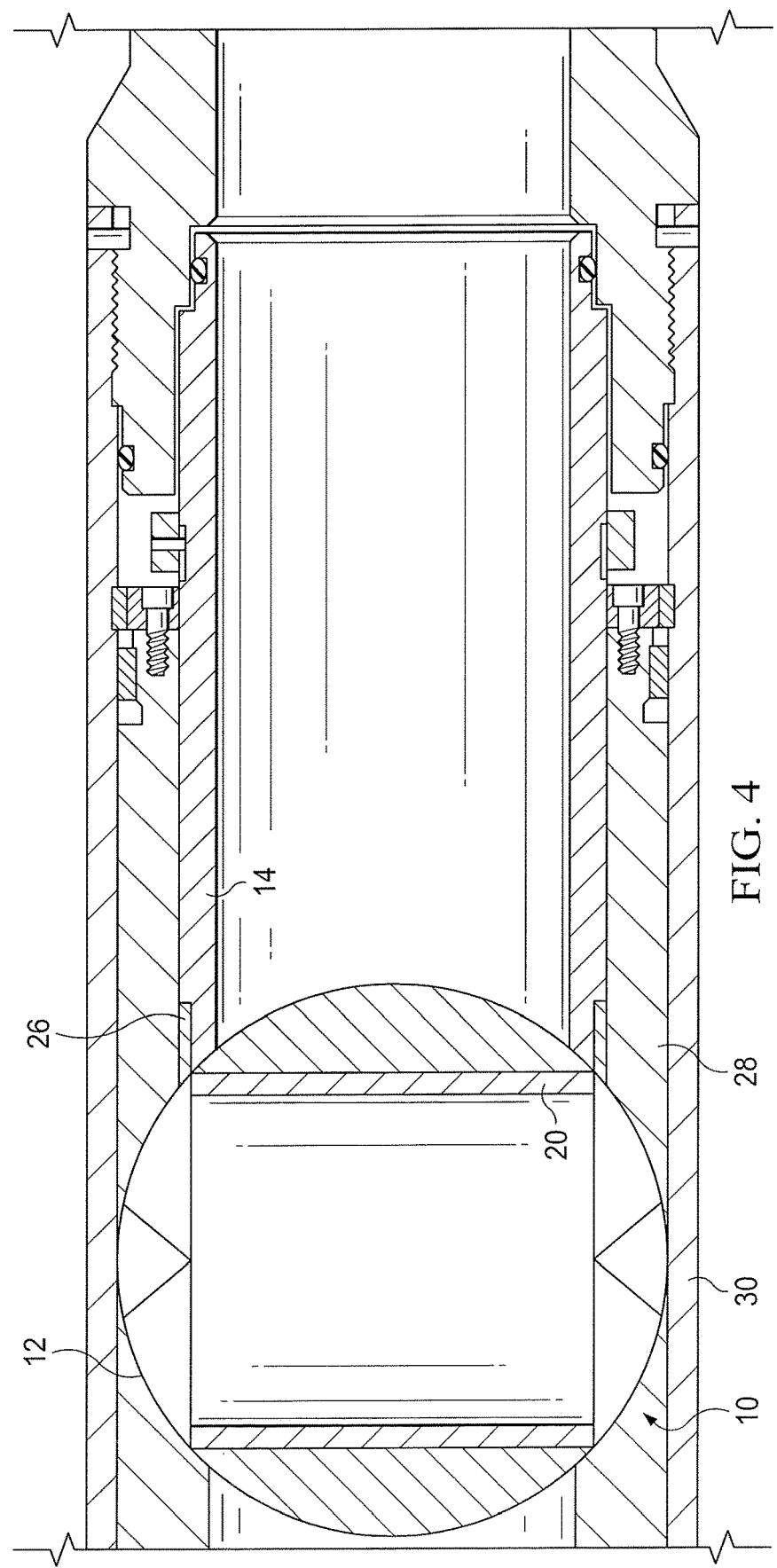
FIG. 4 is a schematic diagram illustrating an isolation barrier valve installed in a section of production tubing.

FIG. 4 shows valve 10 with ball 12 and seat 14 installed within a downhole tool 28, which in turn is shown within a section of production casing or tubing 30. In this application, the valve 10 would be used as a lower completion isolation valve and installed just below the uppermost gravel pack packer in the wellbore formed in the reservoir of interest. As those of ordinary skill in the art will appreciate, however, the valve mechanism 10 may be used in other applications both in the oil field, such as in subsea trees, and outside of the oil field where high temperature, high pressure reliable valves are needed. As those of skill in the art will appreciate, the deeper a hole is in a subterranean formation, the higher the downhole temperatures and pressures will be. In deep and ultra-deep applications the pressures, for example, can be as high as 15,000 psi and possibly even higher. The valve 10 would be suitable for such applications.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A valve, comprising:
a ball having a flow passage formed therein;
a seat disposed adjacent to and in engagement with the ball;
a support sleeve formed in the flow passage of the ball; and
a second support sleeve formed in the flow passage of the ball, wherein one support sleeve is disposed at a first end of the flow passage and the other support sleeve is disposed at a second end of the flow passage opposite the first end of the flow passage, wherein the support sleeve and the second support sleeve in the flow passage of the ball are separated in an axial direction by an intermediate portion of the flow passage of the ball that does not have a subsequent support sleeve positioned therein, wherein the support sleeve and the second support sleeve act to pre-stress the ball such that deformation of the ball at a point of contact between the ball and the seat is minimized or prevented when the ball is positioned such that the flow passage of the ball aligns with a hollow interior region of the seat.

2. The valve according to claim 1, wherein both the support sleeve and the second support sleeve are thermally fit to the flow passage of the ball.

3. The valve according to claim 1, further comprising a support sleeve disposed around at least a portion of the seat.

4. The valve according to claim 3, wherein the support sleeve disposed around at a portion of the seat is thermally fit to an outer circumferential surface of the seat.

5. The valve according to claim 4, wherein the support sleeve on the seat and the support sleeve in the ball are formed of a metal alloy selected from the group consisting of the same alloy used to form the ball and seat, a different metal alloy and combinations thereof.

6. The valve according to claim 4, wherein the support sleeve thermally fit to the seat is disposed at an end of the seat which engages with the ball.

7. The valve according to claim 6, wherein the flow passage comprises a generally-cylindrically shaped hollow region within the ball and the seat comprises a generally tubular-shaped member having the hollow interior region capable of accommodating fluid flow therethrough; and wherein the ball can rotate through at least 90 degrees and is capable of being placed into a first position wherein the flow passage of the ball aligns with the hollow interior region of the seat so as to allow fluid to pass therebetween and capable of being placed into a second position wherein the flow passage of the ball is out of alignment with the hollow interior region of the seat thereby preventing fluid from passing therebetween.

8. The valve according to claim 7, wherein in the first position a seal is created between the support sleeve on the seat and the support sleeve formed in the flow passage of the ball and in the second position a seal is created between the support sleeve on the seat and an outer circumferential surface of the ball.

9. The valve according to claim 3, wherein the support sleeve disposed around the seat acts to pre-stress the seat such that deformation of the seat at the point of contact between the ball and the seat is minimized or prevented.

10. The valve according to claim 1, wherein the support sleeve has a thickness of from about 0.0625 inches to about 0.125 inches.

* * * * *